United States Patent Office 2,726,765
Patented Dec. 13, 1955

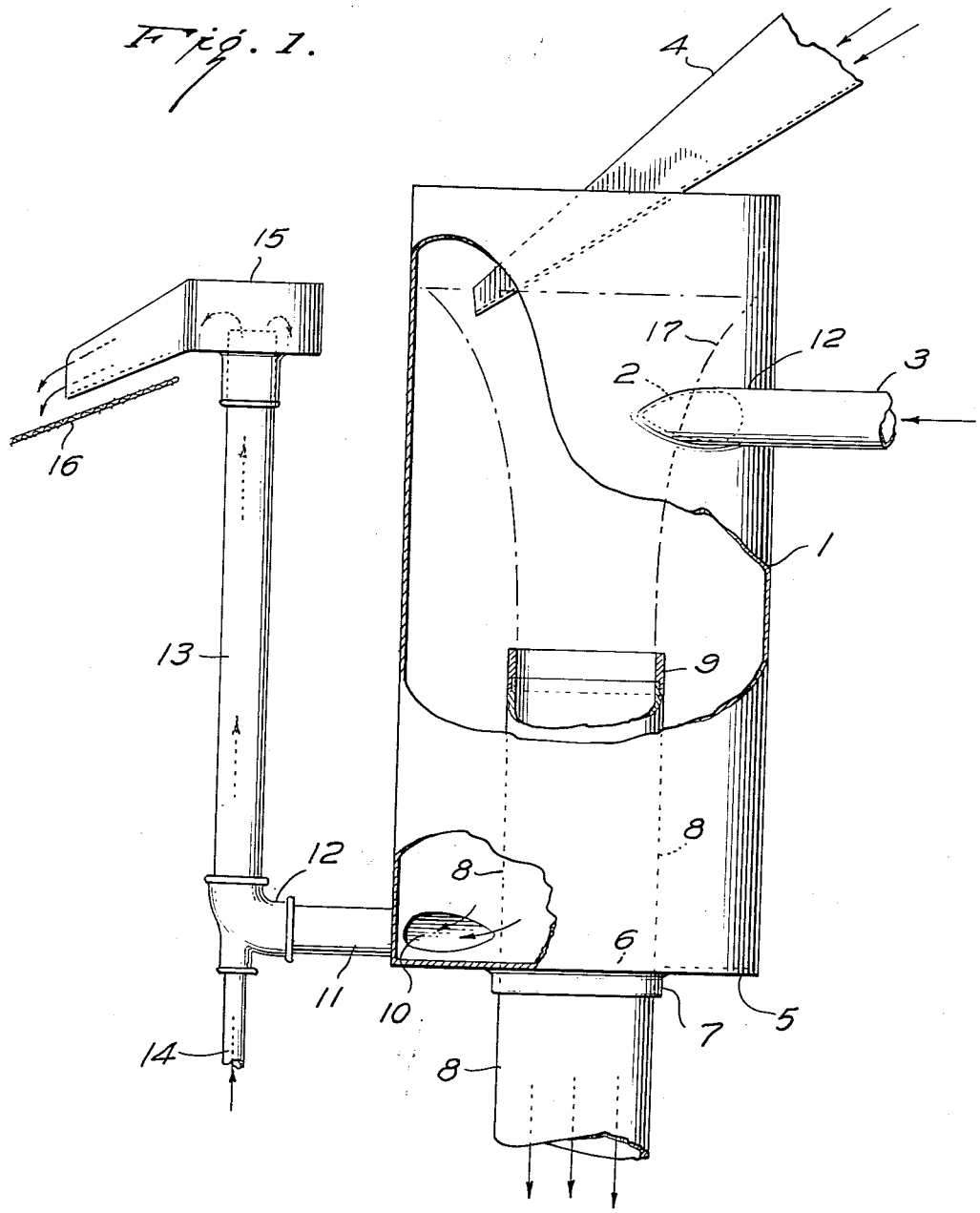

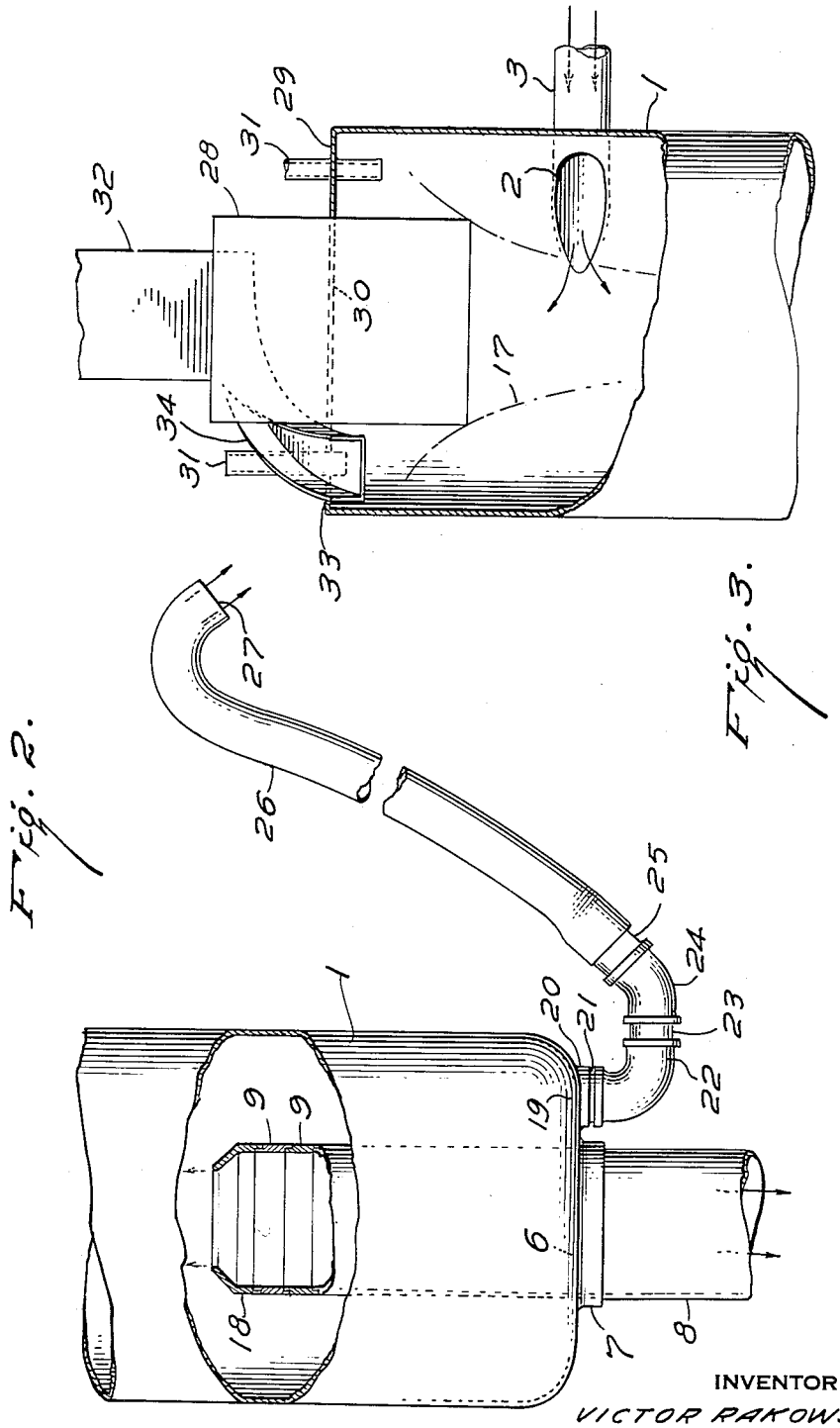

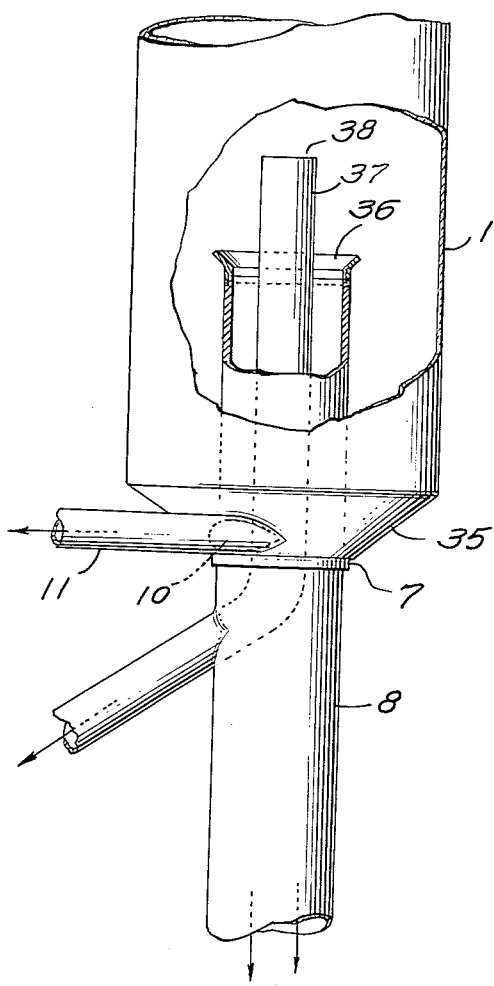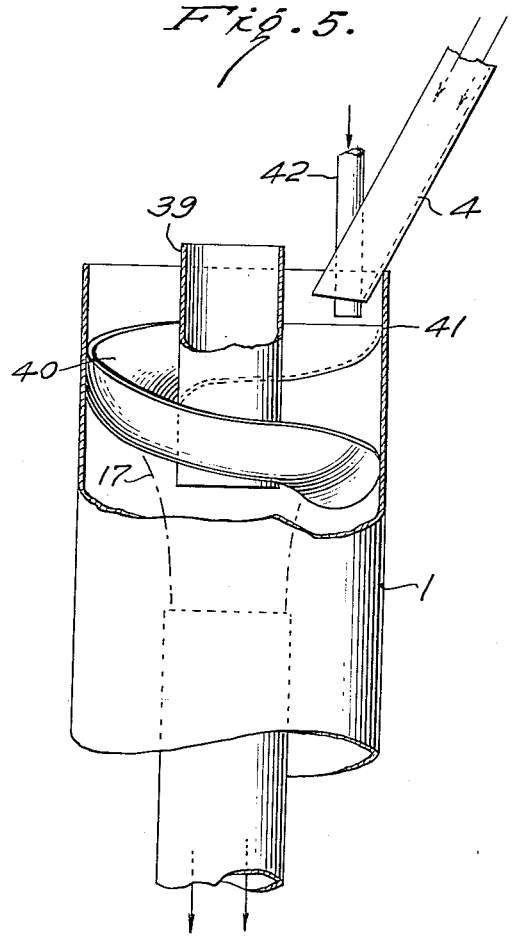

2,726,765
DENSITY SEPARATION—METHOD AND APPARATUS

Victor Rakowsky, Joplin, Mo.

Application August 14, 1951, Serial No. 241,721

7 Claims. (Cl. 209—211)

This invention relates to the separation of heterogeneous mixtures of solid particles into fractions which differ in specific gravity. As such, it contemplates both process and apparatus improvements for making these separations. More specifically, the invention is concerned with improvements in both method and apparatus for making density separations accomplished by treatment in a separatory fluid. Still more particularly, in the present invention, both methods and equipment are provided to accomplish separation at a density greater than that of the separatory fluid.

Cross reference is here made to Applicant's copending applications Serial Nos. 241,722 and 241,725, filed of even date.

In the last several decades, industry has shown a markedly increasing interest in so-called "sink and float" separations of mixtures of solid particles. Industrial progress in this field has included the development of many different process and equipment improvements for the separation of particulate solids mixtures into fractions of differing specific gravity. Many acceptable and successful installations have been, and are being, built and operated. However, one feature, employed in all such processes and equipment is the immersion of the particulate mixture to be separated in some fluid in which the separation is accomplished.

This separatory fluid may take a number of different physical forms. In some cases, it is a true liquid or solution having a sufficiently heavy density. More commonly, however, it will be a heavy media separatory fluid, i. e., will comprise a suspension of solid "medium" or "media" particles in a liquid, usually water or an aqueous solution. Ordinarily, the medium solids are of a sufficient degree of fineness that the suspension for all practical purposes behaves as a true liquid of high density. It is with the use of such suspension-type separatory media that the present invention is primarily concerned. However, the principles developed in this invention can be employed equally well whatever type of medium it may be desirable to use.

The more common types of installation involve the establishment of a large "static" body of relatively quiescent separatory medium. Ancillary thereto are necessary and suitable provisions for maintaining substantially hydraulic equilibrium therein. The solids mixture to be separated is dropped into this body of medium. The lighter gravity fraction floats to the top and is removed, generally by overflowing. The heavier fraction sinks to the bottom and is removed by some suitable mechanical or hydraulic means.

While such systems are highly satisfactory in the results produced, they possess several inherent limitations. One, for example, is in the physical size and quantity of apparatus required. Successful operation on any reasonably large scale requires a large investment in the separatory apparatus and ancillary equipment. In addition, large inventories of medium in the system and in reserve are necessary. Another, is that such systems do not operate at their optimum efficiency when there is a wide variation in the size range to be handled. This can be overcome by suitable size-grading and preparation. However, to do so involves additional costs in labor, overhead and maintenance.

Too, the system loses economic efficiency in treating particles of average diameter below about one-quarter inch. The loss is very marked at particle sizes below about ten mesh, unless special equipment is provided for these smaller particles. Further, the inherently slower settling rates of the smaller particles reduces the capacity of a fixed-size apparatus. Alternatively, but more uneconomically, a multiplicity of units, each to handle a different size-range, may be used.

It is, therefore, a principal object of the present invention to devise a simple separatory method and unit which is less subject to these restrictions. They should not require as large apparatus to treat an equal amount of material. Further they should not be particularly sensitive to the presence of a wide range of particle sizes. Such a unit should be capable of handling mixtures of a size range at least as great as from two inch diameters down to about plus twenty mesh or of proportionate spread in other size ranges, both larger and smaller.

More recently, a modification of the quiescent zone usage has appeared. A similar, high-density, separatory fluid is used. It is caused to whirl in a small confined space at such high angular velocity that an open central vortex is created. The heavier material falls down the outer part of the containing vessel and the lighter, or float fractions rise up through the central vortex. The resultant rotary parting forces are largely independent of and in the order of magnitude of many times normal gravity. Such systems, where they can be used, are highly efficient.

However, such systems, too, are subject to several inherent limitations. While the actual separatory vessel in this process is relatively tiny, the installation is not. It requires an equal, if not greater, overhead for medium in circulation than does a "static" body system such as previously discussed. Often, the investment, overhead and operating expenses in and for the ancillary equipment is even greater than for a static system.

Further, such systems are of no practical utility except when small particles are to be handled. In general, these particles will never exceed these smaller size ranges at which "static" types of heavy-media separation lose their economic efficiency. Nor do these installations permit as wide a range of particle sizes to be treated in any one operation as might be desirable. Moreover, in any operation, whether of single or multiple units, large particles cannot be handled because the feed must be added to the separatory fluid before the introduction of either into the separatory vessel. This means that only material of a sufficiently small size to be passed through a pump at the necessary high velocity rate can be treated.

Moreover, for such systems to obtain a perfect separation, a vortex of circular shape must be created and maintained. This, in turn, is dependent upon the maintenance of a constant pressure of the incoming separatory fluid. When this pressure varies, as it commonly does because of continual pressure fluctuations in the ancillary equipment, the shape of the vortex in the separating vessel tends to be altered. For instance, such pressure fluctuations may cause the vortex to assume an elliptical rather than true circular shape. When this occurs, only a portion of the float fraction rising through the central vortex is free to escape through the circular exit port.

Other types of systems have been proposed. Some have been tried and used, even in large scale operations. However, none of them have been free from most of the objections noted above in the static and high rotary velocity systems discussed.

It is, therefore, a still further object of the present invention to devise a separatory process and apparatus capable of handling, but not limited to, the treatment of small particles. However, they should avoid the large installation requirements of static separatory procedures. Such a process should not be limited to treatment of any particular maximum particle size. On the other hand, it is a further object, in order to decrease the size of the apparatus, to utilize separatory forces greater than those of the normal gravity utilized in static operations.

Removal of both the lighter-gravity and heavier-gravity product fractions from the separatory vessel, regardless of the system used, will involve also the removal of considerable quantities of separatory fluid. For economical operation, it is ordinarily necessary that a system employing heavy media provide for recovering and re-using the entrained medium solids. In general, both fractions are passed over a drainage screen, or some mechanical equivalent. So much of the separatory fluid as will drain from the solids is thus removed. Subsequently, any remaining separatory fluid is washed from the particles. So far as possible, these drainage-media and in some cases washings are returned directly for reuse.

Diluted washings, and usually any drainage medium not directly recycled, are sent to some dewatering system. Therein, the medium solids are freed from excess liquid. Some cleaning must also be done to prevent excessive losses in specific gravity due to recycling of permanent fines and slimes. When magnetic cleaning is used they are usually also demagnetized, at least to a considerable degree. Dewatered and/or cleaned solids are then made up into fluid medium of the requisite density and recycled, together with any necessary fresh medium, as makeup fluid.

In various industrial proposals for the making and use of suspension-type separatory fluids, many different kinds of medium particles have been used. Their nature will determine to some extent the type and extent of the cleaning required to remove permanent slimes and fines.

In some cases, a cheap solid, such as barytes, is used and the necessary cleaning is attempted by continuously discarding part of the medium and replacing it with fresh fluid. In other cases, for example, attempts are made, as by flotation, jigging, settling, or the like, to recover the medium solids content of the withdrawn fluid, thereby separating them from the more permanently suspended fines and slimes.

Industrially, however, a more important modification of these processes utilizes magnetizable medium solids. Finely-divided magnetite, ferrosilicon, crushed steel, roll scale, grinding dusts, etc., are made up into a separatory medium. However, such solids, being magnetically susceptible, may be recovered by magnetic cleaning, i. e., separated from the non-magnetic fines by magnetic forces.

Actually, in the present invention, the type of solids and the specific method used in recovering or cleaning them is not critical. The invention is applicable for use with any suitable recovery system. This is true, whether the separatory medium is a true liquid or a suspension-type "medium." If the medium is a suspension type, then so long as some suitable method of cleaning and recovering the medium solids is available, and the solids may be made up into fresh fluid of the proper density and recycled, the other advantages of the present invention may be obtained.

In general, the objects of the present invention have been successfully accomplished to a highly surprising degree. The separatory system used is a dynamic, rather than static one, in its operating principle. On the other hand, critical high angular velocities even remotely approaching those required to produce an inverted vortex whirl are neither needed nor used. The necessary separatory vessel is small in size compared to those of a normal "static" system. As compared with normal operation of known separators of equal treating capacity, the required volumes of separatory fluid are small. An overall system can be arranged in which the cleaning problems are greatly reduced and in which any size range of particles may be successfully handled. Such an overall system forms the subject matter of my copending application Serial No. 241,725, filed of even date.

In general, the separatory process of the present invention is simple. It consists in imparting to a flow of a relatively large volume of medium, a rotary motion such that, in falling through a partially confined space, a free vortex is established. A particulate mixture to be treated is introduced onto or into an upper level in this vortex. One flow of fluid from the confined space, normally the principal flow, is by free flow into a central opening. The latter is of such diameter that it normally does not run full of liquid.

This central opening should be above the bottom of the confined space and lead into a conduit. The latter extends from the bottom upwardly into the confined space and with the outer walls of the latter gives the lower part of the confined space an annular horizontal cross-section. The lighter-density fraction, regardless of particle size, is carried into this opening by a weir overflow, falls down the inner walls of the conduit and out of the vessel. At all times then a fixed minimum volume of liquid is present in the lower annular confined space, since some overflow is always maintained. The heavier density particles fall to the bottom of this confined annular space. They are removed therefrom by some suitable means at a level below that of the overflow opening, usually at or near the bottom of the annular space.

A further discussion of the present invention may probably be more readily followed by reference to the accompanying drawings, in which:

Fig. 1 is an elevation, partly in section, showing one form of separator utilizing the principles of the present invention;

Fig. 2, also an elevation, partly in section, shows a further modification of the apparatus using a different type of discharge system for the heavy-density fraction; and Figs. 3, 4 and 5 are elevations, partly in section, of additional modifications showing variations in means for feeding and discharge adaptable for use with the apparatus of Fig. 1.

As will be seen from Fig. 1, for example, an apparatus as utilized in the practice of the present invention may be readily constructed. For some of the parts, there are available standard fittings, shapes and forms. The others are readily shaped from steel plate by riveting and welding. This is an appreciable advantage in that it eliminates any necessity for special castings and prefabrications.

As shown in Fig. 1, an apparatus arrangement illustrating the principles of the present invention is essentially simple in construction. A suitable space is horizontally confined by a tank or cylinder 1. Opening into the side of this cylinder at an upper level therein, there is a medium inlet port 2, the port opening being preferably, but not necessarily, tangential. Through this port, fluid separatory medium is supplied from a substantially horizontal conduit 3, attached about port 2 by any desired means, usually by welding.

The upper end of cylinder 1 is open. Descending through this open end is the lower end of a feed chute 4. Particulate material to be treated is sent down this chute from any convenient storage system. Since the latter forms no part of the present invention and is conventional, it is not shown.

The bottom of cylinder 1 is comprised of a suitable plate 5 attached thereto by welding or riveting. Near the center of bottom plate 5 is an opening 6, surrounded by a suitable collar 7. Within collar 7, filling central opening 6 and supported by collar 7, is a conduit 8, which extends from some level below the bottom of cylinder 1, up through central opening 6 and into the space confined by cylinder 1. The height to which conduit 8 extends up into cylinder 1 may be regulated by vertical adjustment within the sleeve or collar 7, or by adding or removing an extension ring 9. Several such rings may be used.

Conduit 8 creates, with cylinder 1 and plate 5, a confined annular space within the lower section of cylinder 1. In the vertical wall of cylinder 1, near bottom plate 5, is an additional port 10, again preferably, but not necessarily, tangential. It is closed by, and opens into, the end of a short conduit 11 which is attached to the cylinder as by welding or other equivalent means. Conduit 11 extends horizontally into a T 12. Port 10 and conduit 11 are provided for the removal from the confined annular space of the heavy density fraction which settles to the bottom thereof during operation.

Conduit 11 opens into T 12 which has one of its other openings in an upward direction. A conduit 13, substantially similar in diameter to conduit 11 rises upwardly from this opening. T 12 has a downward opening generally of considerably smaller diameter. Into this opening is fitted a smaller conduit 14. Conduit 14 extends into T 12 and conduit 13 and with them acts as an injector to make an airlift of conduit 13 for raising material therethrough.

Material carried upwardly through conduit 13 by the airlift action is discharged into a suitable discharge launder 15. Material from the discharge launder usually flows onto some suitable drainage screen such as indicated as screen 16. On the latter, separatory fluid is drained by natural gravity from the particulate material. Both the solids and fluids flow to some additional operating processes, which form no part of the present invention and therefore are omitted.

It is believed the operation of this modification should be apparent from the foregoing discussion. Separatory fluid is introduced through conduit 3 and port 2 into cylinder 1. Entering tangentially, it is introduced under sufficient force and in sufficient volume to produce a free vortex, which will have an approximate profile such as shown at 17. In this respect, the vortex or whirlpool utilized differs from that obtained in a bowl centrifuge or the like, which will have a reverse of this free vortex profile.

Entering tangentially, fluid moves circularly downwardly and around the inner walls of the cylinder until it fills the lower inner annular space. So long as this annular space is maintained filled, a weir overflow into the lip and down the inner surface of conduit 8 will occur. Due to the direction of fluid inflow into cylinder 1, the fluid therein will at all times be moving radially around and downwardly at the same time. This sets up what appears from above to be a whirlpool having a vortex inside conduit 8. This vortex is open from the top of cylinder 1 through to the bottom of conduit 8.

Once these conditions are established, air is introduced through conduit 14, causing a liquid flow through conduit 11 and up through conduit 13 to some height in equilibrium with the fluid within tank 1. Inflow through conduit 3 is adjusted to maintain the whirlpool and a sufficient overflow down conduit 8, as well as allow for discharge through conduit 11.

Particulate material enters the open top of cylinder 1, down chute 4 and is discharged onto or just below the surface of the whirlpool near its upper rim. Due to the whirling action and high density of the fluid, lower gravity particulate material is carried around and down, at or near the surface of the whirlpool. The higher gravity dense particles are carried out into and down through the outer part of the fluid into the concentric space between conduit 8 and the inner wall of cylinder 1. Air introduced into T 12, through conduit 14, withdraws fluid through the lower port 10 and conduit 11 at a rate sufficient to remove from cylinder 1 all of the more dense solids carried down into the annular section. A tangential positioning of port 10 is helpful in assisting the residual circular motion of the fluid within the confined concentric space to force the heavier particles out into conduit 11.

Adjustment of the separator for the desired operation is relatively simple. It is the volume of flow through the apparatus which is the principal factor. There are several variable adjustments. The amount of separatory fluid entering through conduit 3 may be regulated. The rate of fluid raised through conduit 13, by means of air introduced through conduit 14, also may be adjusted.

Accordingly, the height of pipe 8 above the bottom 5 is set at some approximate height. Fluid is introduced through conduit 3 until the cylinder 1 is filled, the vortex is established, and flow through conduits 8 and 13 are set up. Solids are then fed into the fluid through chute 4. The solids overflowing down the inner surface of conduit 8 are collected and examined. If an insufficient amount of the lower-density fraction is overflowing down the central conduit 8, the latter may be lowered or the amount of fluid entering through conduit 3 increased, or both.

If too great a proportion of the higher-density material is being carried down through conduit 8, it is an indication that the rotary velocity thereabove is too slow, or the overflow volume is too great. This may be remedied by increasing the flow of fluid raised through conduit 13, by raising conduit 8, by decreasing the inflow of separatory fluid or by a combination of any two or all three. In addition, adjustment may be obtained by altering the inlet opening diameter, into conduit 8. This will be discussed below in conjunction with Figure 2.

In any case, separation at a desired density for a particular feed rate may be brought into adjustment very quickly. Once equilibrium is obtained, the apparatus is sufficiently flexible so that it will continue to run with very little supervision almost indefinitely. The treating capacity is tremendous. For example, using a small model about eight inches in diameter and ten inches high, having a two inch central opening with the conduit extending about three inches into the tank and a three-quarter inch heavy discharge opening, perfect separation at about 2.75 was obtained on 1200–1500 pounds per hour of minus quarter-inch zinc ore. Fluid at about 2.6 specific gravity was supplied at about six pounds pressure through a one inch pipe. In a larger apparatus, about six feet high by four feet in diameter, with eight inch pipes in both discharge openings, using a medium at 2.85 sp. gr., 100–150 tons per hour were easily handled.

One feature should be noted. It is desirable that the walls of the cylinder or tank 1 should extend vertically to a level considerably above that at which fluid is introduced into the cylinder. In setting up an operating flow, the upper lip of the vortex rises up the inner wall of the cylinder 1 to a considerable distance above inlet port 2. The walls should be sufficiently high to allow for this effect. Also, it should be noted that in continuous operation, some sudden surges on the line are inevitable. Cylinder 1 should be of sufficient additional height to prevent overflowing from its top, when such surges occur.

A somewhat different modification is shown in Fig. 2. However, it will be seen that there are a number of common elements. There is the same outer shell or cylindrical form 1, lower port 6, flange 7, downpipe 8 and adjusting rings 9. In connection with these rings, one particularly useful modification is shown in Fig. 2. As discussed above, for different causes during operation, it may be desirable to decrease the volume leaving the separator through the low-gravity discharge opening into downpipe 8. In addition to the controls discussed above, this volume can be modified by reducing the effective diameter of the inlet opening into the downpipe. One way of accomplishing this is by the use of suitable tapered adjusting rings 18. As shown in Fig. 2, the bottom of ring 18 is shaped in the same manner as are the bottoms of rings 9. Ring 18 may fit either directly on top of pipe 8 or one of rings 9. However, the top of ring 18 is flared upwardly and inwardly to a smaller-size opening. If so desired, a plurality of these rings of successively smaller opening may be utilized. It is obvious that if it is desired to increase the central flow, a ring flared outwardly to a larger diameter may be used.

A second modification is also illustrated in Fig. 2. As shown in Fig. 1, the heavier-density fraction is discharged through a horizontally-opening, tangential port 10. While a tangential opening may be preferable, it is not essential. For example, in Fig. 2, the bottom of the vessel is pierced by a second port 19. Port 19 is surrounded, on the outside of the vessel, by flange 20, communicating by a conventional nipple 21 with a 90° elbow 22. This turn is connected by a second conventional nipple 23 to a 45° elbow 24, which in turn is connected through a third short nipple 25 to a long rubber hose 26. The latter being flexible, its upper end may be raised or lowered. The hydraulic head within cylinder 1, taken in conjunction with the annular velocity of the fluid within the vessel, will lift the heavier density fraction through the hose 26 to some level in equilibrium therewith. Minor adjustments of the elevation of discharge end 27 of hose 26 provides very effective means for modifying the volume discharged through port 19.

Still further modifications are shown in Fig. 3. Particularly, there is illustrated in Fig. 3 a useful method of adding the solid feed to be treated. Again, in Fig. 3, we see several elements common to Fig. 1, for example cylindrical shell 1, medium inlet port 2, medium inlet conduit 3 and free vortex profile 17. However, the top of cylinder 1 has located centrally therein an open ended cylindrical baffle 28. Baffle 28 is of sufficient length to extend from a level above the cylinder down into the cylinder to about the height at which it will contact profile 17 of the free vortex.

Baffle 28 may be supported in any conventional manner. As shown in Fig. 3, this is done by welding a cover plate 29 over the top of the cylinder and welding the cylindrical segment within an open hole 30 in the center thereof. Baffle 28 extends above and below plate 29. In order to vent the volume enclosed between the outer wall of cylinder 28, the bottom of plate 29 and the inner wall of cylinder 1, suitable vents 31 are provided. These are simply short pipe sections welded, or mounted by any equivalent means, in suitable holes through plate 29.

As seen in Fig. 3, the lower end of a conventional feed hopper 32 is located directly behind cylinder 28. Extending in a curving downward direction around cylinder 28, and into a suitable hole 33 in the top of cover plate 29, is a solids feed chute 34. By this method of delivery of particulate material to be treated between the wall and the baffle accidental fall of pieces without treatment down through the central vortex and into downpipe 8 is prevented.

A number of possible variations are illustrated in Figure 4. In some cases, there are appreciable quantities of middlings in the mixture to be treated. Their average density so closely approximates the density of separation that a longer treating time is required for them to be definitely classified in one fraction or the other. In the past such material has been allowed to pass principally into one fraction or the other. If necessary or desirable, this fraction may be retreated at a slightly different parting density. In the modification shown in Figure 4, this effect can be obtained by treating such mixtures in a single pass through one unit.

As shown in Figure 4, the cylindrical section 1 is mounted on a short conical frustum 35. At the bottom of the frustum is the usual collar 7 mounting and supporting the central discharge conduit 8. In the sloping side of frustum 35 is the usual heavy fraction discharge port 10 leading into conduit 11. The upper end of conduit 8, within the vessel, has an adjustment ring 36 differing from ring 18 in Figure 2 in that it flares outwardly.

Within the central discharge conduit 8 and concentric therewith is an additional discharge conduit 37. It has a centrally located open end 38 at a level higher than the intake into conduit 8. Conduit 37 extends concentrically down through conduit 8 to a level usually, but not necessarily, below collar 7 and is there bent and passes out through the side of conduit 8.

This additional central conduit permits several variants in use. As noted above, conduit 37 may be used to receive and discharge the normal central discharge flow, including the vortex surface, and a middlings fraction may be discharged through conduit 8. On the other hand, it may be desirable simply to increase the volume of the light fraction without increasing the rate of heavy fraction discharge through conduit 11 or the rate of incoming medium. This can be readily accomplished by the use of the plurality of central discharge conduits.

A somewhat different modification is shown in Figure 5. In some cases horizontal space is at a premium. This modification is adapted for such situations. As shown in Figure 5, the open top of the tubular section 1 is equipped with a novel baffle arrangement. A tubular baffle 39 is mounted concentrically in the open top of the cylinder. In the resultant space between the outer wall of tube 39 and the inner wall of cylinder 1 is a spiral curved baffle 40 which closes the space and is so shaped as to divert material discharged onto the initial end 41 thereof into a spiral circular path and establish the whirlpool profile 17. The vessel is otherwise equipped with central discharge and lower discharge conduits of the types shown in Figures 1 or 2. Material to be treated is introduced through the usual feed chute 4. If necessary the feed chute may be closed on all sides. Separatory fluid may be introduced with the particulate material through conduit 4, if so desired, but is preferably brought in independently as for example through the vertical conduit 42.

It will be apparent that the necessary elements contained in the apparatus combination of the present invention are fairly few and simple. There must be a containing vessel in which a free vortex can be set up. Within this vessel there must be a central discharge opening into which the vortex discharges. At some higher level there must be provision for introducing fluid treating medium. There must be a means for feeding solids, preferably at a level about that of the top of the free vortex to be formed. In addition, there must be provided some means for removing the fluid entering the central discharge opening from the separator and there must be means for removing the solid particulate material which settles in the confining space to levels below that of the central discharge opening.

Various mechanical modifications differing from those shown and capable of performing these functions may obviously be used. For example, the central discharge conduit 8 need not pass through the bottom of the vessel. It might be turned at some point below its inlet opening and passed through the side of the vessel. In the latter case, the heavier fraction discharge port may be at any point on the bottom of the tank or at any low level near the sides thereof. Again for example, the mounting of baffle 28 in a top plate may be modified by any suitable mounting spider or mechanical equivalent. In that case, vent holes and vent pipes may be omitted. Various mechanical equivalent substitutions will present themselves to those skilled in the art. For example, a plurality of concentric central discharge pipes may be used, each opening at a lower level. This will permit either separating the lighter flow into two or more fractions if so desired, or increasing the volume of a composite fraction.

Similarly, the processing limitations are essentially few and simple. A sufficient flow into the vessel must be maintained to insure formation of the free vortex profile, rather than a centrifugal vortex. In addition, sufficient flow must be maintained into the central discharge opening not only to carry the larger particles into the opening but the necessary proportion of lesser-density solids. Sufficient flow should be available to discharge the heavy material settling in the lower part of the vessel. As was noted, these exit flows must be maintained without failing to maintain the free vortex profile. Finally, as to the particulate material, care must be taken in feeding that it be added in such a manner that no appreciable quantities thereof will be carried down through the central vortex opening without time for treating contact with the medium. So long as these precautions are maintained, there may be considerable variation in the processing flows.

There is a definite advantage in maintaining a volume of spiralling fluid below the central discharge opening or openings. Due to the spiral flow, a density gradient develops from the bottom of the vessel to the top. Taken in conjunction with the forces exerted by the spiral flow, it is possible to accomplish separation of the particulate mixture into fractions at an apparent parting density higher than the specific gravity of the incoming separatory fluid. For example, the specific gravity of separation may be from 0.03 to several tenths higher than the actual specific gravity of the incoming separatory medium.

This ability of the process of the present invention to operate at a parting density above the average specific gravity of the separatory fluid produces several other additional advantages. Where a magnetic cleaning system is used to recover media, it makes little difference whether demagnetization is done or not. The magnetic aggregates will be broken up by the operation of the process, the centrifugal and centripetal forces ordinarily being greater than the magnetic attraction of the ferro particles. It reduces the necessary amount of the medium solids in circulation in any one operation. Perhaps even more important, it permits the use of coarser medium solids than would be suitable for conventional operations. If the medium is made up of coarser media solids, its viscosity is lower and the sharpness of separation is increased. Presumably this is due to the decreased resistance to the passage of particles through the moving layers of separatory fluid.

At the expense of some loss of sharpness of separation, use of coarser media can be advantageously employed in another way. It cuts down on the necessary amount of medium cleaning, which must be carried on. The separatory system is less sensitive and greater amounts of slimes and fines in the recycled medium can be tolerated without viscosity becoming excessive.

In addition, there is a still further advantage. The same phenomenon that permits the operation at a parting density greater than the specific gravity of the fluid produces some thickening of the heavy fraction flow. Slimes and fines, therefore, preponderantly pass with the lighter density fraction. The heavy drainage medium, if so desired, can be in most cases directly recycled without any further cleaning. With regard to the light fraction drainings and washings and the heavy fraction washings, only a minimum volume must be sent to the medium solids cleaning and recovery system. Also, because of the fluid medium containing coarser media solids having a greater tolerance for slimes and fines, considerable amounts of the light-fraction drainings and some washings may be directly recycled as diluent liquid. This fraction can be greater in proportion to the total amount of fluid in circulation than for any previously known systems.

In addition, because the medium solids used are coarser than in normal operation of previously known procedures, a large part of the solids may be quickly recovered by thickening without the necessity for passing the entire fraction to be cleaned through a complete cleaning.

When a magnetic cleaning system is used, this is an appreciable advantage in reducing the investment in ancillary equipment. Not only can a larger fraction be recycled, but because of the quicker settling of the coarser media, the fraction containing only water, slimes and valueless fines may be directly discharged without ever having to pass through the medium solids cleaning system.

In operating the process of the present invention, one feature should be noted. Contra to practice in cyclonic systems, wherein velocities must be maintained sufficiently high to produce an inverted vortex, no such factors enter into the present operation because high pressures are not necessary. In operating the separation process of the present invention, the volume of flow is more important than pressure. As noted above, certain volumes are required through the various discharge conduits to maintain separation conditions. So long as this volume of fluid is delivered to the unit, the pressure at which it is delivered is relatively unimportant.

Another advantage of the process of the present invention is its relative freedom from sensitivity to surges which alter the flow conditions. For example, in running a test operation in cleaning coal, perfect separation was obtained even during changes of as much as three to one in the throughput volume. On the other hand, a cyclonic type separator, operating at higher pressures began to lose efficiency on an 8–5 pressure drop and lost its vortex and dropped badly on a 2–1 change, pressure in this case being a measure of the flow input.

For purposes of comparison of the efficiency of the present invention with previously comparable operations, the following facts should be noted. As compared with a static system, units of 2–6 feet in height and diameter have treating capacities equal to static cones of from 10–20 feet in diameter. If the necessary flow is maintained, separation is so sharp and quick that apparatus size is almost irrelevant, except as noted above, when there is a high preponderance of very small material.

The volume of flow required to maintain operation of the present separator is on the order of magnitude of the amount of return fluid introduced into a static cone of substantially equal treating capacity. It may be much less in some cases. There is, therefore, no necessity for maintaining a high pressure, high volume circuit, as in a cyclonic type separator.

The following examples will further illustrate the invention:

Example 1

A sample of low-grade zinc ore assaying about 5.7% zinc and sized at minus ⅜ inch plus 10 mesh was treated in accordance with the present invention. Using a medium solids combination of 75% ferrosilicon and 25% magnetite at 2.73 sp. gr., about 54% of the weight was discarded to produce a concentrate assaying 10.7% zinc and containing about 94% of the zinc.

Example 2

In a larger scale operation on a minus 2 inch plus ¼ inch size range of low-grade zinc ore, using a separator six feet high by four feet in diameter with six inch discharge orifices on each discharge port, excellent separations with a minimum of zinc loss in the tailings were obtained under a variety of treating conditions. Illustrative results are shown in the following table:

| Feed, Tons Per Hour | Medium Gravity | Assays (Percent Zinc) | | |
|---|---|---|---|---|
| | | Feed | Sink | Float |
| 39 | 2.826 | 1.90 | 11.80 | .25 |
| 41 | 2.819 | 1.93 | 7.00 | .26 |
| 57 | 2.824 | 2.60 | 9.80 | .21 |
| 66 | 2.82 | 1.88 | 7.80 | .21 |

The excellent tailing assays compare favorably with an average tailing for similar ores of 0.29–0.30% zinc at a medium density of about 2.84–2.85 in a static cone separation.

I claim:

1. A device for separating mixtures of particulate solid materials into fractions of differing average densities, respectively heavier and lighter than a selected parting density, which device comprises: a first tubular element horizontally defining a confined space and having a bottom enclosing means; means for introducing fluid medium into an upper level in said confined space, said means having its discharge at a level in said confined space substantially below the top of said first tubular element; means for introducing a mixture of particulate materials into an upper level of said confined space; a second tubular element extending from without up and into said confined space, said second tubular element having one end thereof open to said confined space at the horizontal center and at an intermediate level thereof for discharging fluid medium and said lighter fraction, said first and second tubular elements defining a lower annular zone; and a discharge conduit communicating with a low level in said lower annular zone and extending outwardly from said first tubular element for discharging the remaining fluid medium and solids from said confined space.

2. A device for separating mixtures of particulate solid materials into fractions of differing average densities, respectively heavier and lighter than a selected parting density, which device comprises: a first tubular element horizontally defining a confined space and having a bottom enclosing means; a fluid medium inlet means adapted to tangentially introduce fluid medium into an upper level in said confined space at a point substantially below the top of said first tubular element, means associated with said inlet means for regulating the flow of said fluid medium; means for feeding a mixture of particulate materials into an upper level of said confined space and means associated with said feed means for controlling the rate of feed of said mixture; a second tubular element extending from without up and into the confined space and having the upper end thereof open horizontally and centrally within said confined space at an intermediate level therein for discharging fluid medium and said lighter fraction, said first and second tubular elements defining a lower annular zone; a discharge conduit communicating with a low level in said annular zone, for discharging the remaining fluid medium and solids, and control means associated with said discharge conduit for proportioning the flow of fluid medium and solids to be discharged from said confined space through said conduit.

3. A device as in claim 2 in which the first tubular element is of constant cross sectional area throughout its height.

4. A device as in claim 2 in which the first tubular element progressively decreases in cross sectional area toward the bottom enclosing means.

5. A device as in claim 2 in which the second tubular element consists of a plurality of interlocking detachable tubular sections, whereby the height to which said tubular element extends into said confined space may be varied.

6. A device as in claim 5 in which the uppermost tubular section presents an open end to said confined space greater in cross sectional area than at any other point in the remainder of said tubular element.

7. A device as in claim 5 in which the uppermost tubular section presents an open end to said confined space smaller in cross sectional area than at any other point in the remainder of said tubular element.

References Cited in the file of this patent

UNITED STATES PATENTS

| Number | Name | Date |
|---|---|---|
| 872,555 | Capps | Dec. 3, 1907 |
| 1,301,544 | Crombie | Apr. 22, 1919 |
| 1,825,157 | Pardee | Sept. 29, 1931 |
| 2,109,234 | Keenan | Feb. 22, 1938 |
| 2,528,974 | Ritsch | Nov. 7, 1950 |
| 2,538,870 | Hunter | Jan. 23, 1951 |
| 2,543,689 | Driessen et al. | Feb. 27, 1951 |